United States Patent
Chen et al.

(10) Patent No.: US 7,317,855 B2
(45) Date of Patent: Jan. 8, 2008

(54) METHOD OF IMPARTING TWIST TO OPTICAL FIBER

(75) Inventors: Xin Chen, Corning, NY (US);
Ming-Jun Li, Horseheads, NY (US);
Nicol A. Heron, Wilmington, NC (US);
Jeanne L. Swecker, Wilmington, NC (US); Naiyue Zhou, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/015,509

(22) Filed: Dec. 16, 2004

(65) Prior Publication Data
US 2006/0133751 A1 Jun. 22, 2006

(51) Int. Cl.
*G02B 6/02* (2006.01)
(52) U.S. Cl. ...................................... 385/123
(58) Field of Classification Search ............. None
See application file for complete search history.

(56) References Cited

U.S. PATENT DOCUMENTS

| | | | |
|---|---|---|---|
| 4,509,968 A | 4/1985 | Arditty et al. | 65/10.1 |
| 4,792,347 A | 12/1988 | Deneka et al. | 65/3.11 |
| 5,298,047 A | 3/1994 | Hart, Jr. et al. | 65/3.11 |
| 5,418,881 A * | 5/1995 | Hart et al. | 385/123 |
| 5,704,960 A | 1/1998 | Evans et al. | 65/402 |
| 5,897,680 A | 4/1999 | Geertman | 65/402 |
| 5,943,466 A | 8/1999 | Henderson et al. | 385/123 |
| 6,240,748 B1 | 6/2001 | Henderson et al. | 65/402 |
| 6,324,872 B1 | 12/2001 | Blaszyk et al. | 65/504 |
| 6,536,700 B2 | 3/2003 | Watson et al. | 242/419.7 |
| 6,550,282 B2 | 4/2003 | Roba et al. | 65/402 |
| 6,550,283 B2 | 4/2003 | Blaszyk et al. | 65/402 |
| 6,791,678 B2 * | 9/2004 | Huang et al. | 356/73.1 |
| 6,837,074 B2 * | 1/2005 | Cocchini et al. | 65/382 |
| 2004/0017986 A1 | 1/2004 | Garner et al. | 385/123 |
| 2004/0062514 A1 | 4/2004 | Weeks et al. | 385/147 |
| 2004/0062515 A1 | 4/2004 | Garner, Jr. et al. | 385/147 |
| 2004/0112090 A1 | 6/2004 | Lee et al. | 65/402 |

(Continued)

FOREIGN PATENT DOCUMENTS

WO     WO2004/021055     3/2004

(Continued)

OTHER PUBLICATIONS

Li et al, "Effects of lateral load and external twist on polarization-mode dispersion of spun and unspun fibers", Optics Letters, vol. 24, No. 19, Oct. 1, 1999, pp. 1325-1327.

(Continued)

*Primary Examiner*—Sung Pak
*Assistant Examiner*—Hoang Tran
(74) *Attorney, Agent, or Firm*—Robert L. Carlson

(57) ABSTRACT

A method for producing low-PMD fiber, in which a glass fiber is drawn from an optical fiber perform by a tractor which pulls such optical fiber from said perform; subsequent to said tractor pulling the fiber is twisted about its axis to increase the magnitude of twist which is imparted to said fiber. The fiber is then wound onto a fiber storage spool such that at least a portion of the twist imparted to said optical fiber is retained while said fiber is wound on said spool.

20 Claims, 4 Drawing Sheets

U.S. PATENT DOCUMENTS

| | | | |
|---|---|---|---|
| 2004/0163418 A1 | 8/2004 | Mohanty et al. | 65/402 |
| 2004/0184751 A1 | 9/2004 | Chen et al. | 385/123 |
| 2004/0232571 A1 | 11/2004 | Tong et al. | 264/1.24 |
| 2006/0147116 A1 | 7/2006 | Roba et al. | 385/123 |

FOREIGN PATENT DOCUMENTS

| | | |
|---|---|---|
| WO | WO2004/050573 | 6/2004 |
| WO | WO2004/095097 | 11/2004 |

OTHER PUBLICATIONS

Sarchi et al, "PMD Mitigation Through Constant Spinning and Twist Control: Experimental Results", OFC 2003, vol. 1, pp. 367-368.

Schuh et al, "Polarization Mode Dispersion in Spun Fibers with Different Linear Birefringence and Spinning Parameters", Journal of Lightwave Technology, vol. 16, No. 9, Sep. 1998, pp. 1583-1588.

* cited by examiner

METHOD OF IMPARTING TWIST TO OPTICAL FIBER

BACKGROUND OF THE INVENTION

1. Field of the Invention

The present invention relates generally to methods and apparatuses for imparting fiber twist, and more particularly, to methods and apparatuses for imparting mechanical twist in optical fiber to reduce polarization mode dispersion (PMD) and to ensure optical fiber quality.

2. Technical Background

Light traveling in an optical fiber has two polarization modes. For optical fibers that are perfectly circularly symmetric in both geometry and internal and applied stress, operation at a wavelength or in a wavelength range which is regarded as "single-moded" actually supports two orthogonal polarization modes, wherein the two polarization modes are degenerate, propagate with the same group velocity and have no time delay after traveling the same distance in the fiber. However, in practice, optical fibers are not perfectly circularly symmetric. For example, imperfections such as geometric and form deformation and stress asymmetry break the degeneracy of the two modes. As a result, the two polarization modes propagate with different propagation constants. The difference between the propagation constants is called birefringence. Polarization mode dispersion (PMD) occurs in an optical fiber as a result of small birefringence induced by deviations of the fiber's core from a perfectly cylindrical shape, asymmetric stresses or strains, and random external forces acting upon the fiber. PMD is well known to severely impair transmission of optical signals at relatively high bit rates.

Various attempts to reduce PMD have been made and involve imparting a spin rotation into the fiber during manufacturing. One prior art method of reducing PMD involves spinning the preform during the fiber drawing process. Another method of combating PMD is to deliberately spin the fiber as it is drawn from the preform, so that a mechanical spin becomes "frozen" into the fiber as it cools. The resulting rotation of the birefringence axis in the fiber produces continual mode-coupling between the orthogonal polarization modes of a carried signal, thereby inhibiting the accumulation of a significant phase lag between the two modes, and consequently causing a significant reduction in the fiber's PMD.

A method as specified in the opening paragraph is known from United States Patent U.S. Pat. No. 6,324,872, wherein the drawn fiber is caused to pass over a roller whose rotational axis can be canted, so that the pulley can be caused to rock back and forth about an axis perpendicular to its rotational axis. The rocking motion of the roller produces a spin in the fiber along a substantial portion of its length. In particular, portions of warm fiber which are spun in this manner will become endowed with a permanent spin as their constituent material subsequently cools. This "spin" travels up the fiber to where the fiber is essentially in a malleable state, thereby solidifying the spin in the fiber as the fiber cools.

In addition to "spin", another metric regarding optical fibers that is measured during the manufacture is "twist". The spin and twist metrics are related, and some may use such terms interchangeably. However, as used herein, spin refers to the rotation introduced into the molten optical fiber, whereas twist refers to the rotational twist which is imparted to the cooled optical fiber. As discussed above, spin imparted into the molten fiber is permanently fixed when the fiber is cooled. Twist refers to the mechanical rotational force imposed on the optical fiber after it has cooled. Twist introduces torsional stresses on the fiber, and extreme amounts can cause microscopic cracks, and ultimately physical destruction of the fiber. Twist can be removed from the fiber by untwisting the fiber or allowing the fiber to relax, e.g. by hanging a very long length of fiber and allowing the fiber twist to "untwist" itself.

SUMMARY OF THE INVENTION

The present invention relates to methods for producing low PMD fiber via imparting a twist to the optical fiber. In one aspect of the present invention, a glass fiber is pulled or drawn from an optical fiber preform, for example by a tractor device which pulls the optical fiber from the preform. At some point after the tractor has pulled the optical fiber from the preform, and the fiber has cooled to the point where it is essentially non-malleable, the optical fiber is twisted about its axis to increase the magnitude of twist which is imparted to the fiber. Thereafter, the fiber is wound onto an optical fiber storage spool such that at least a portion of the twist which was imparted to the optical fiber is retained while said fiber is wound on the spool. Preferably, the optical fiber is coated prior to contact with the tractor wheel.

The twisting of the optical fiber may be performed prior to the fiber being cut from the continuous length of optical fiber which is being pulled from the optical fiber perform. In other words, such twist can be imparted to the fiber during the optical fiber draw process, before the optical fiber is stored onto a storage spool. Alternatively, the twisting step can occur offline. For example, the optical fiber may be drawn and stored on a fiber optical fiber storage spool and then taken offline and the twist imparted to the optical fiber prior to being stored on a second storage spool, where the twist is maintained on the second storage spool.

In one embodiment for applying mechanical twist to an optical fiber offline (i.e. not in the course of the fiber draw process) a fiber is stored on a central section of a first fiber storage spool having at least one flange end. The fiber is pulled from the first spool, and a torque is applied to the fiber via contact with a torque increasing device, said torque causing the fiber to undergo rotation around the longitudinal axis of the fiber such that the twist is impressed on the fiber. Thereafter the fiber is stored on a second fiber storage spool such that at least a portion of the twist imparted to said optical fiber is retained while said fiber is wound and stored on the second spool. Preferably, the torque is alternately applied in a clockwise and counterclockwise direction, such that the twist impressed on the fiber is alternately clockwise and counterclockwise.

The preferred torque increasing device for this embodiment includes at least one roller. Preferably, the fiber is engaged with a first roller disposed on a first side of the fiber at a first location along the length of the fiber, the first roller having a first roller axis transverse to the length of the fiber. The fiber is also engaged with at least one second roller disposed on a second (preferably opposite that of the first roller) side of the fiber at locations upstream and/or downstream from said first location so that the first roller is longitudinally aligned with a gap between the second roller(s), the second roller(s) having second roller axes transverse to the longitudinal direction. The fiber is maintained under tension so that the fiber bears on the first and second rollers. The rollers rotate about said roller axes; and the first roller rocks relative to said frame of reference about a rocking axis transverse to the length of the fiber and transverse to the first roller axis so that the first roller axis tilts from perpendicular to the longitudinal direction, whereby said rotation of the rollers will twist the fiber. In other words, the first roller axis is tilted alternately in opposite directions from perpendicular to the longitudinal direction.

Preferably, during the twist imparting process, the fiber is removed without having to remove the fiber from the first storage spool by pulling the fiber over the flange of the spool. In other words, preferably the twist is imparted to said fiber while pulling the fiber between the two flange ends of the first spool, such that in order to remove fiber from the first fiber spool, the first fiber spool has to rotate and the fiber is pulled therefrom.

In any of the methods disclosed herein, the twist may be unidirectional or bidirectional. Preferably the twist is bidirectional, and more preferably, the twist profile is sinusoidal. Preferably the twist magnitude applied to the fiber via any of the methods disclosed herein is at least one turn per meter, more preferably at least 2 turns/meter and most preferably at least 3 turns/meter, and the twist period or twist repeat distance is at least 10 meters, more preferably at least 20 meters, and most preferably at least 50 meters. The twist magnitude is also preferably less than 10 turns/m, more preferably less than 6 turns/m.

Applying twist to the optical fiber in this manner has the effect of reducing the measured PMD in the fiber. Any of the methods for applying twist to the fiber as disclosed herein can be used to reduce the PMD in either spun (i.e., a fiber to which has been spun in a manner in which the spin imparted into the molten fiber is permanently fixed when the fiber is cooled) or unspun fiber. In one preferred embodiment, the twist is applied to unspun fiber. In another embodiment, the twist is imparted to a fiber which has already received a spinning treatment to reduce PMD (and therefore has been spun in a manner in which the spin imparted into the molten fiber is permanently fixed when the fiber is cooled).

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
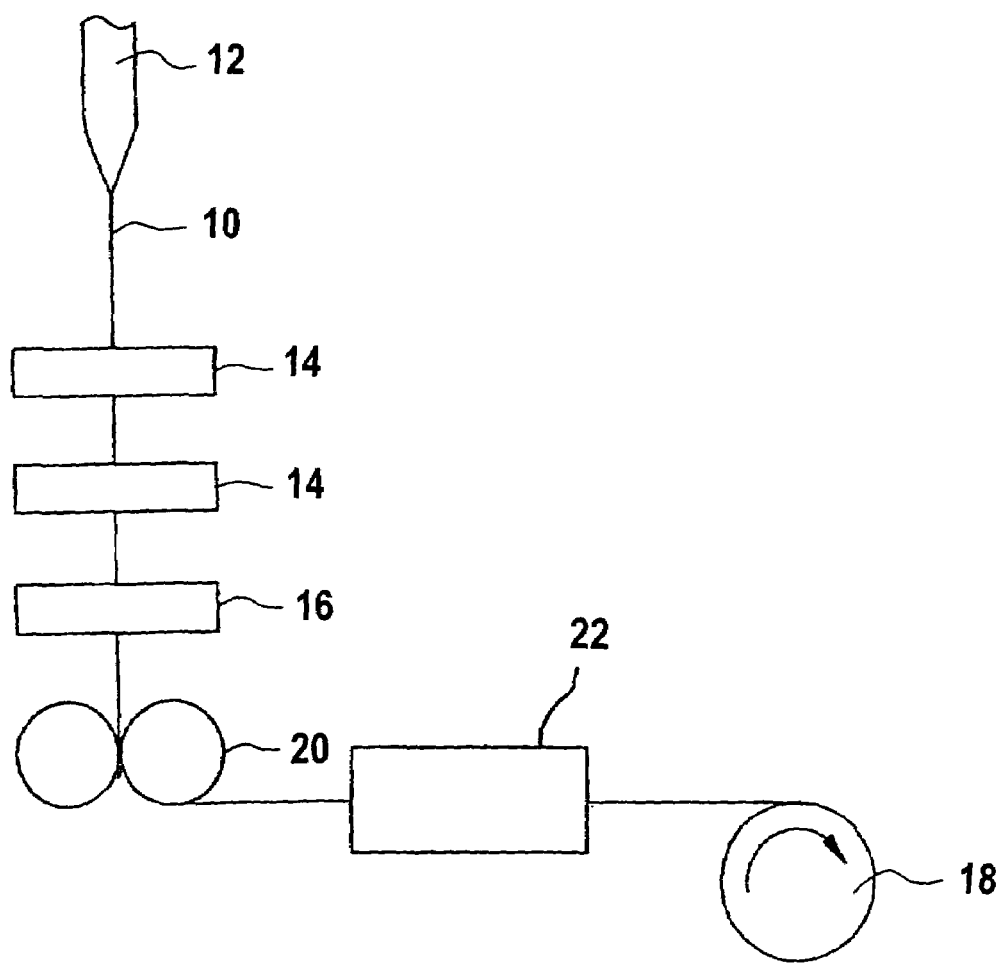
FIG. 1 is a schematic illustration of a typical fiber draw operation.
Figure 2:
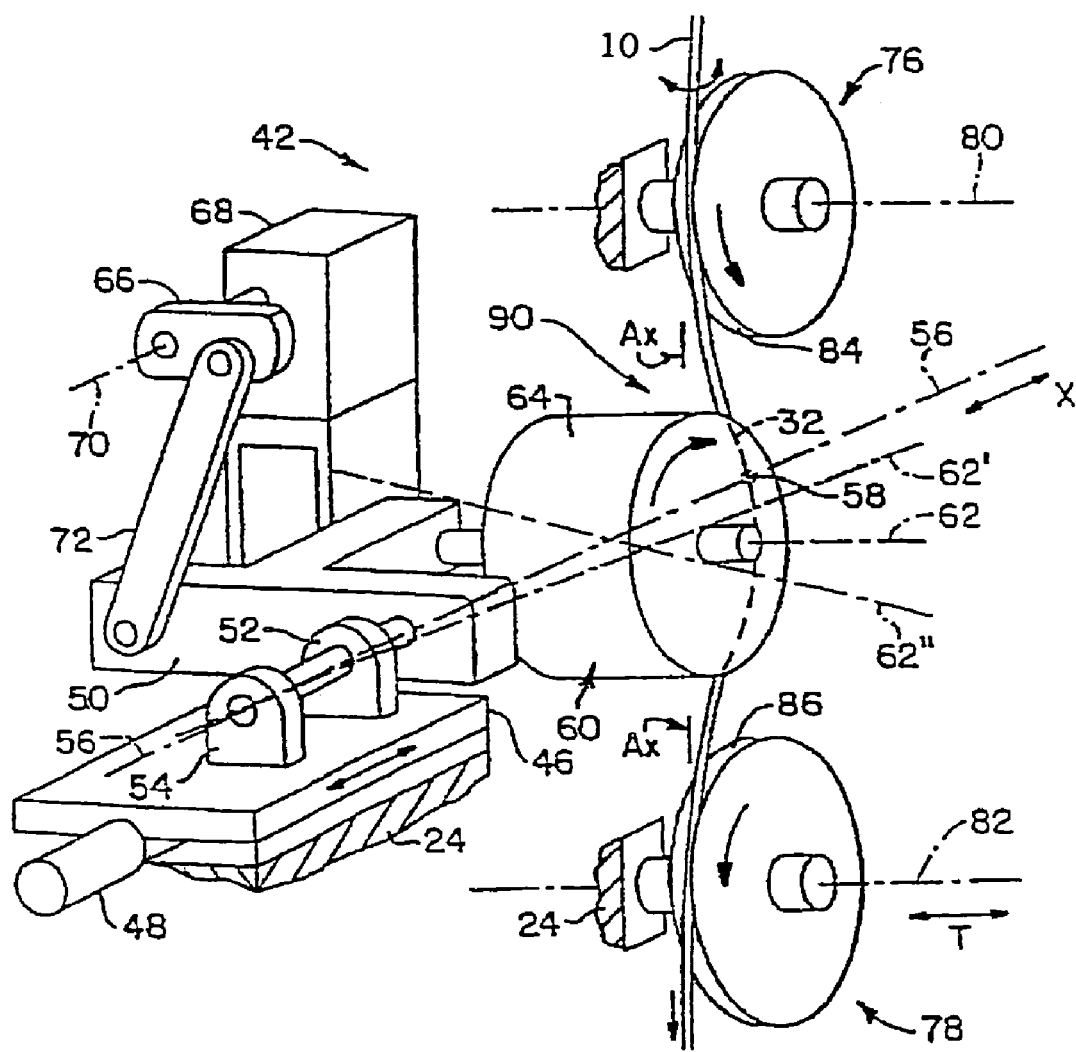
FIG. 2 is an example of a twist device useful in carrying out the method of the present invention.

Whenever possible, the same reference numerals will be used throughout the drawings to refer to the same or like parts. One exemplary apparatus for carrying out the methods of the present invention is illustrated in FIGS. 1 and 2. FIG. 1 illustrates a typical fiber draw operation schematically. The fiber draw operation illustrated in FIG. 1 comprises four major steps: (1) drawing fiber 10 from a preform 12 disposed in a draw furnace; (2) passing fiber 10 through at least one coater 14 for coating fiber 10 with at least one UV curable acrylate coating; (3) curing the coating by passing the coated fiber through at least one curing element 16 and (4) winding the coated fiber onto a spool 18 for storage and transport. The winding portion starts at the tractor 20. In the embodiment illustrated, the tractor comprises a pair of wheels between which the fiber is pinched. However, other variations of tractors could be employed, for example where the fiber is pinched between a belt and capstan. In the embodiment illustrated in FIG. 1, twist is imparted to the optical fiber at the twisting device 22.

In a melt zone adjacent the upstream end of the fiber path, i.e., at the point where the fiber is being drawn from the perform 12, the fiber is substantially molten. However, as the fiber moves downstream, it is cooled and solidified so that when the fiber reaches a point considerably downstream from draw furnace, the fiber has cooled to a substantially solid state. Cooling devices may be provided between the melt zone and the coaters to facilitate cooling of the fiber to a solid state. Desirably, the cooling device provides non-contact cooling of the fiber, such that no solid object touches the surface of the fiber while it cools.

The coating device 14 is typically adapted to apply a polymeric coating on the outside of the fiber. Preferably, the coating device is also a non-contact device. That is, the fiber passes through coater 14 without contacting or engaging any other solid object. Suitable non-contact coaters are disclosed, for example, in U.S. Pat. No. 4,792,347. The apparatus may further include additional guide rollers (not shown), for diverting the fiber and hence the fiber path from a straight line or for further constraining the fiber in the path. Other conventional elements such as quality testing equipment and the like may also be included.

Any apparatus which is capable of imparting a twist to the fiber may be used to carry out the methods of the present invention. FIG. 2 illustrates such an apparatus which is capable of producing the twist functions disclosed herein to impart the desired twist to the optical fiber. The device illustrated in FIG. 2 may be used to impart a twist to the fiber either on-line. i.e., during the fiber draw process, for example by locating the device between the tractor and the take up storage spool, or off-line. Preferably, if used off line the device is located between a first storage spool having fiber stored thereon which is to be twisted and an empty storage spool. Fiber is pulled from the first storage spool, preferably by pulling the fiber between the outside flanges that exist on the fiber storage spool, and preferably without pulling the fiber over one of the end flanges. The fiber is then twisted by the device, after which the fiber is stored on a second storage spool. The twisting apparatus illustrated in FIG. 2 includes an adjustable carriage 46 slidably mounted to frame 24 for movement in cross-path directions X transverse to the longitudinal direction of the fiber path. A micrometer adjustment device 48 is provided for moving the carriage in the cross-path directions and for locking the carriage in place once the same has been adjusted to the desired location relative to frame 24. A yoke 50 is mounted to carriage 46 by a shaft 52 and I bearings 54 so that yoke 50 is pivotable relative to carriage 46 and hence relative to frame 24 about a rocking axis 56 extending in the cross-path directions X and intersecting the fiber path at a point of intersection 58.

Twist assembly 42 further includes a cylindrical first roller 60 mounted to yoke 50 for rotation about a first element axis 62. Roller 60 has a circumferential surface 64 encircling first element axis 62 and coaxial therewith. The frame of a motor 68 is mounted to carriage 46. A crank 66 is supported on the shaft of motor 68 so that the motor can turn crank 66 around an axis 70 parallel to the rocking axis 56. A connecting rod 72 has one end pivotally connected to crank 66 remote from its axis 70 and has the opposite end pivotally connected to yoke 50 remote from rocking axis 56. Thus, rotation of crank 66 about crank axis 70 will drive yoke 50 in a rocking motion about rocking axis 56 between a first extreme position in which the roller axis or first element axis 62 is tilted to the position indicated in broken lines at 62' in FIG. 2 and a second extreme position in which the roller axis or first element axis 62 is tilted in the opposite direction to the position shown in broken lines at 62" in FIG. 2. Extreme positions 62' and 62" are disposed at equal but opposite extreme tilt angles E1 and E2 from a nominal position 62 in which the roller axis or first element axis is perpendicular to the longitudinal direction of the fiber path. In all positions of the roller including these extreme positions, however, the roller axis 62 remains generally transverse to the longitudinal direction of the fiber path. Desirably, each extreme angle E is between about 2 and about 10 degrees from nominal position. As further, discussed below, the desired angle depends upon the desired amount of twist to be imparted to the fiber. The angles E may be adjusted by adjusting the dimension of crank 66 and particularly, the spacing between the pin joint of connection rod 72 and axis 70. The speed of rotation of motor 68 determines the rate at which the yoke 50 and first element 60 will rock between the two extreme positions. Motor 68 may be an adjustable speed device such as a stepper motor driven by a digital control system of the conventional type, a DC motor driven by an adjustable voltage source, an air motor driven by an adjustable gas source, or any other conventional variable-speed motor. Alternatively, motor 68 may be fixed-speed device.

The spin-imparting assembly 42 further includes a second element incorporating an upstream roller 76 and a downstream roller 78. Roller 76 is mounted to frame 24 for rotation about an axis 80 perpendicular to the longitudinal direction of the fiber path and upstream from first element 60 whereas roller 78 is mounted to frame 24 downstream from first element 60 for rotation about an axis 82 parallel to axis 80 and also perpendicular to the longitudinal direction of the fiber path. Upstream roller 76 has a circumferential surface in the form of a surface of revolution about axis 80. The circumferential surface includes a generally V-shaped groove 84 aligned with the fiber path, so that the fiber is received in the groove. Downstream roller 78 has a similar groove 86, also aligned with the fiber.

As best seen in FIG. 1, the upstream and downstream rollers 76 and 78 are spaced apart in the longitudinal direction of the fiber path so that they define a gap 90 between them. First element or roller 60 is received in this gap. That is, the circumferential surface 64 of the first rotor extends slightly into the gap in the cross-path direction X. Fiber 10 and hence the path of the fiber bend in the cross-path direction through a cross-path deflection angle Ax at each of the upstream and downstream rollers and likewise bends around the first roller 60 in the cross-path direction. The cross-path deflection angle Ax desirably is in the range of about 1 to about 30 degrees, and preferably between about 5 and about 15 degrees. The cross-path deflection angle varies with the setting of carriage 46. The circumferential surfaces of the rollers desirably are formed from hard, wear resistant materials such as metals or ceramics. The fiber and the fiber path are tangent to the first roller at the point of intersection 58 of rocking axis 56 and the fiber path. When the first roller 60 is in its nominal position, the first roller axis 62 is parallel to the axes 80 and 82 of the upstream and downstream rollers, and all of these axes extend in lateral directions T, perpendicular to the longitudinal direction L and perpendicular to the cross-path direction X.

Such spinning devices are further described in U.S. Pat. Nos. 6,550,283 and 6,324,872, the specifications of which is hereby incorporated by reference. Apparatus other than that shown in FIG. 2 can be used in the practice of the invention. See, for example, U.S. Pat. No. 4,509,968, as well as U.S. Pat. Nos. 5,298,047; 5,897,680; 5,704,960; and 5,943,466. In general terms, the twisting apparatus typically will include fiber-contacting means for applying a spinning or twisting force to a fiber, e.g., a roller, and drive means for moving the fiber-contacting means in a non-sinusoidal spatial pattern as a function of time, e.g., a computer-controlled drive motor and associated mechanical linkage for defining the motion of the fiber-contacting means.

Additional mechanisms for practicing the methods of the invention will be evident to persons skilled in the art from the disclosure herein, e.g., mechanisms for sinusoidal or non-sinusoidal spinning of a preform, when such preform spinning is used alone or in combination with applying a spinning force to a fiber.

Figure 3:
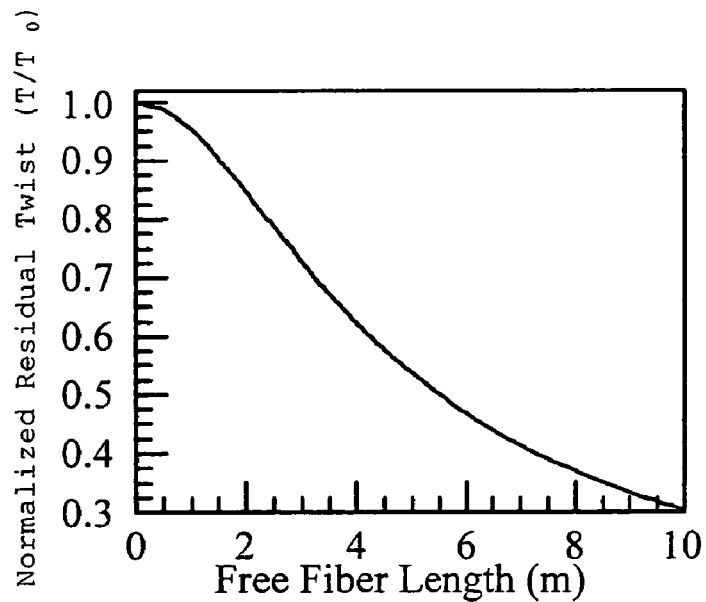
FIG. 3 illustrates the effect that varying the fiber free length has on the amount of residual twist that is retained on a fiber storage spool.

Preferably, the twist is imparted to the optical fiber so that the twist period is at least 10 meters, more preferably at least 20 meters, and even more preferably at least 50 meters, although applicants believe that the upper limit to the period in which the twist can take place is not limited, and thus, the twist period could be as long as 100 meters or more. In order to facilitate retaining of the twist on the fiber after the twisting device 22 has twisted the fiber, the fiber free length, which is the distance between the twisting device and the storage spool, is preferably less than 10, more preferably less than 5 and most preferably less than 3 meters. To illustrate, reference is made to FIG. 3, which illustrates the normalized residual twist vs. the fiber free length (defined herein as the longest path between two rollers subsequent to fiber being contacted by the twisting device and prior to being wound on the fiber storage spool). FIG. 3 illustrates the effect of varying the fiber free length for a sinusoidal twist profile having a 20 m twist period or repeat distance. As shown in FIG. 3, after the fiber has passed through twisting device 22, it is desirable to have the free fiber length be as short as possible to capture the fiber twist.

The twist profiles employed herein to impart the twist to the fiber can be unidirectional or alternatively can be of any periodic shape. Preferably, the twist profile employed is of a periodic shape wherein the fiber is twisted first clockwise and then counter-clockwise. The periodic twist profile is also preferably a symmetric twist profile, wherein the magnitude of the maximum twist rate in the counter-clockwise direction is at least substantially equal to the magnitude of the twist rate of the fiber when twisted in the clockwise direction. The shape of the periodic twist profile could be any shape, including but not limited to sinusoidal, non-sinusoidal, triangular, trapezoidal or other periodic twist functions with similar or longer twist periods. The most preferred twist profile employed herein is a sinusoidal twist profile which is symmetric in the magnitude of the twist rate of the clockwise and counter-clockwise directions.

Figure 4:
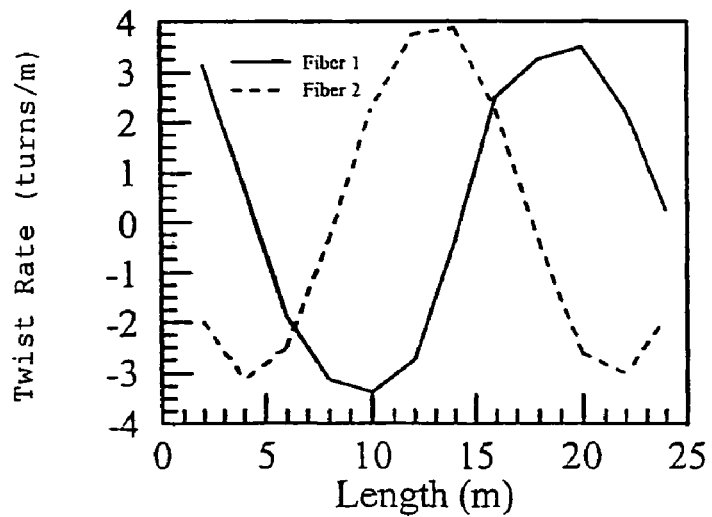
FIG. 4 illustrates a preferred sinusoidal twist profile in accordance with one embodiment of the invention.

FIG. 4 illustrates a sinusoidal bidirectional twist profile (in turns/m vs. length in meters) in accordance with the present invention. Note that in fiber 2, the twist profile is not as symmetric in magnitude as fiber 1, that is, the twist profile used to treat fiber 2 has a degree of offset. Offset is the accumulated twist over the fiber distance, normalized to unit length. Offset occurs as a result of a sinusoidal twist which is not perfect, e.g., the twist magnitude in one direction is not exactly equal to the twist magnitude in the opposite direction.

Figure 5:
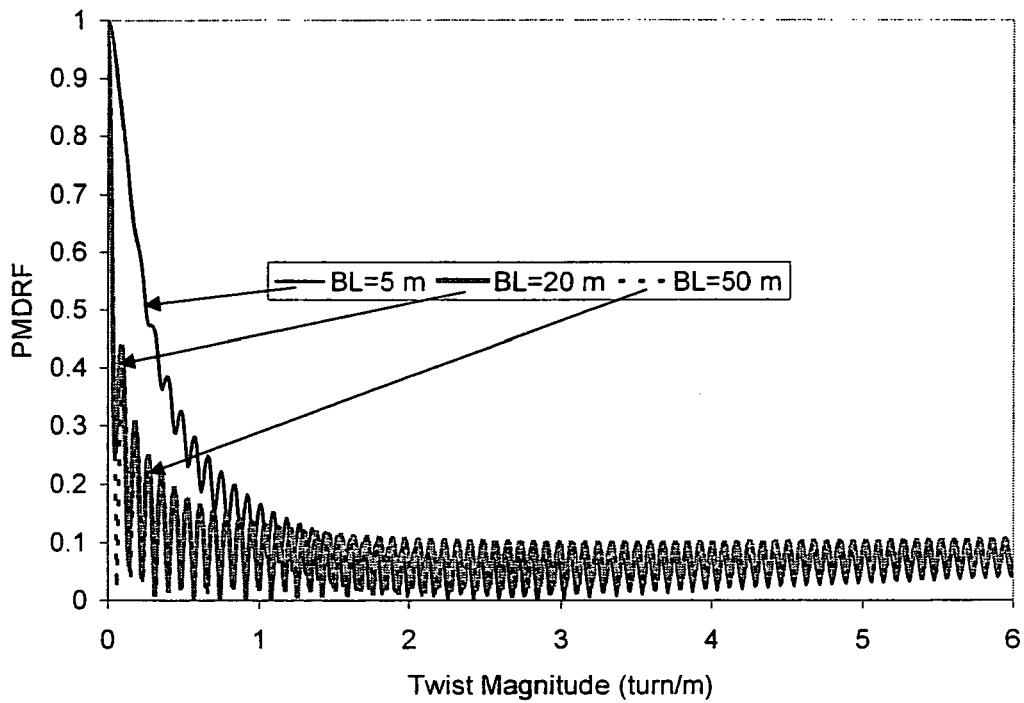
FIG. 5 illustrates the effects of bidirectional twist on unspun fibers having various beat lengths.

FIG. 5 illustrates the effects of bidirectional twist on unspun fibers having various beat lengths (5, 20, and 50 m). The twist profiles employed did not exhibit any significant offset. FIG. 5 illustrates that, even for twist magnitudes as low as 0.5 turn/meter, significant PMD reduction can be achieved on fibers having various beat lengths. Even more preferably, as illustrated the twist magnitude should be greater than 1 turn/meter.

Figure 6:
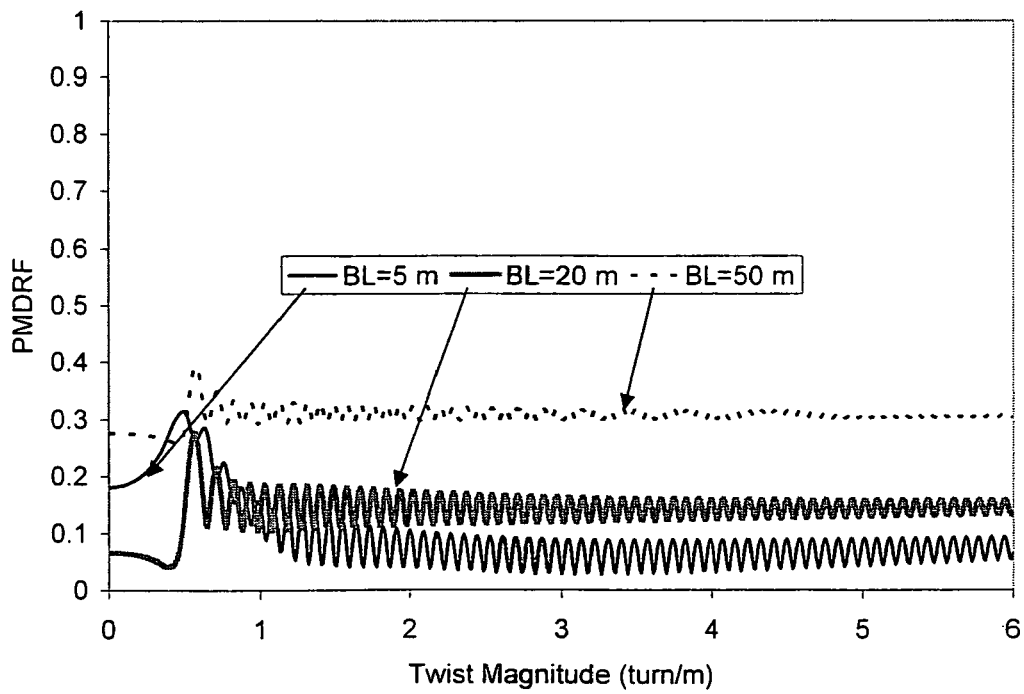
FIG. 6 illustrates the effects of bidirectional twist on unspun fibers having various beat lengths having some degree of offset.

FIG. 6 illustrates the effects of bidirectional twist on unspun fibers having various beat lengths (5, 20, and 50 m), this time with about 0.5 turns/meter offset. As FIG. 6 illustrates, even for fibers having varying levels of beat lengths, and even under circumstances which result in offset being imparted to the twisted fiber, bidirectional twist can be employed to effectively lower the PMD in the fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents. For example, while some of the examples set forth above are for unspun optical fiber, these examples would also work on spun optical fiber.

What is claimed is:

1. A method for producing low-PMD fiber comprising:
   drawing a glass fiber from an optical fiber perform by a tractor which pulls such optical fiber from said perform;
   at a location subsequent to said tractor pulling said fiber and prior to said fiber being cut, twisting the optical fiber about its axis to increase the magnitude of twist which is imparted to said fiber; and
   winding the optical fiber onto a spool such that at least a portion of the twist imparted to said optical fiber is retained while said fiber is wound on said spool.

2. The method of claim 1, wherein said twisting step occurs as a result of a mechanical twisting device which is located along the fiber path downstream of said tractor.

3. The method of claim 1, wherein said twist is unidirectional.

4. The method of claim 1, wherein the twist profile employed to generate the twist in said fiber is bidirectional.

5. The method of claim 4, wherein the twist profile employed to generate the twist in said fiber is sinusoidal.

6. The method of claim 4, wherein the twist profile employed to generate the twist in said fiber comprises a twist repeat distance of greater than 5 meters.

7. The method of claim 4, wherein the twist profile employed to generate the twist in said fiber comprises a twist repeat distance of greater than 10 meters.

8. The method of claim 4, wherein the twist profile employed to generate the twist in said fiber comprises a twist repeat distance of greater than 20 meters.

9. The method of claim 1, wherein said twist magnitude is at least one turn/meter.

10. The method of claim 9, wherein said twist magnitude is at least 3 turns/meter.

11. A method of applying mechanical twist to an optical fiber comprising: pulling a fiber from a central section of a first fiber storage spool having at least one flange end; applying a torque to the fiber via contact with a torque increasing device, said torque causing the fiber to undergo rotation around the longitudinal axis of the fiber such that the twist is impressed on the fiber, and thereafter storing said fiber on a second fiber storage spool such that at least a portion of the twist imparted to said optical fiber is retained while said fiber is wound on said second spool.

12. The method according to claim 11, wherein the torque is alternately applied in clockwise and counterclockwise direction, such that the twist impressed on the fiber is alternately clockwise and counterclockwise.

13. The method of claim 11, wherein the alternating torque is applied using via contact with at least one roller.

14. The method of claim 13, wherein the alternating torque application step comprises engaging the fiber with a first roller disposed on a first side of the solidified fiber at a first longitudinal location, said first roller having a first roller axis transverse to the length of the fiber; (c) engaging the fiber with at least one second roller disposed on a second side of the fiber at locations upstream and/or downstream from said first location so that the first roller is longitudinally aligned with a gap between the second rollers, said second rollers having second roller axes transverse to the longitudinal direction; (d) maintaining the solidified fiber under tension so that the fiber bears on the first and second rollers; (e) rotating said rollers about said roller axes; and (f) rocking said first roller relative to said frame of reference about a rocking axis transverse to the length of the fiber and transverse to the first roller axis so that said first roller axis tilts from perpendicular to the longitudinal direction, whereby said rotation of the rollers will twist the fiber.

15. The method as claimed of claim 14 wherein said rocking step is performed so as to tilt the first roller axis alternately in opposite directions from perpendicular to the longitudinal direction.

16. The method of claim 11, wherein said twist is imparted to said fiber while simultaneously pulling the fiber between the two flange ends of the first spool, said spool having to rotate to enable said fiber being pulled from said first spool.

17. The method of claim 11, wherein the resulting twist imparted to the fiber is greater than 1 turn per meter.

18. The method of claim 12, wherein the twist profile employed to generate the twist in said fiber is sinusoidal.

19. The method of claim 12, wherein the twist profile employed to generate the twist in said fiber comprises a twist repeat distance of greater than 5 meters.

20. The method of claim 12, wherein the twist profile employed to generate the twist in said fiber comprises a twist repeat distance of greater than 10 meters.

* * * * *